United States Patent [19]
Barancik et al.

[11] Patent Number: 4,897,028
[45] Date of Patent: Jan. 30, 1990

[54] APPARATUS FOR THERMOPLASTICALLY PROCESSING SYNTHETIC POLYMERIC RESINS

[75] Inventors: Martin B. Barancik, Evansville, Ind.; Erich O. Teutsch, Marietta, Ga.

[73] Assignee: General Electric Company, Mt. Vernon, Ind.

[21] Appl. No.: 28,647

[22] Filed: Mar. 20, 1987

[51] Int. Cl.⁴ .................................................. B29F 1/08
[52] U.S. Cl. .................................. 425/144; 425/378.1; 425/DIG. 13; 264/25; 264/DIG. 46
[58] Field of Search ................. 425/143, 144, 378 R, 425/DIG. 13; 264/22, 25, 40.1, DIG. 46

[56] References Cited
U.S. PATENT DOCUMENTS

| | | | |
|---|---|---|---|
| 3,158,899 | 12/1964 | Demeter | 425/378 R |
| 3,185,432 | 5/1965 | Hager | 425/DIG. 13 |
| 3,761,550 | 9/1973 | Seefluth | 264/25 |
| 4,370,115 | 1/1983 | Miura | 425/543 |
| 4,387,165 | 6/1983 | Youngblood | 436/121 |
| 4,484,883 | 11/1984 | Honda et al. | 425/144 |
| 4,514,160 | 4/1985 | Davidsmeyer | 425/549 |

Primary Examiner—Charles Hart
Attorney, Agent, or Firm—Martin Barancik; Joseph Eisele

[57] ABSTRACT

Apparatus for the thermoplastic processing of polymeric resins is improved by the use of thin-film resistance heaters as the means of applying thermal energy to the resin. The heaters are mounted within the resin processing chamber and in particular the resin flow channels of, for example, an injection molding machine.

8 Claims, 3 Drawing Sheets

APPARATUS FOR THERMOPLASTICALLY PROCESSING SYNTHETIC POLYMERIC RESINS

BACKGROUND OF THE INVENTION

1. Field of the Invention

The invention relates to apparatus for the thermoplastic processing of thermoplastic polymeric resins and more particularly relates to such apparatus including an improved means of maintaining the thermoplasticity of the resin during processing.

2. Brief Description of the Prior Art

The prior art literature is replete with descriptions of apparatus for thermoplastically processing thermoplastic, synthetic, polymeric resins; see for example the descriptions given in the U.S. Pat. Nos. 2,859,476; 3,308,508; 3,404,432; 3,820,927; 3,402,427 and 4,512,730.

In general, such apparatus includes resin extruders, injection molding apparatus, blow-molding apparatus, thermoplastic resin coating devices, resin laminators and like apparatus. Processing in such apparatus may include mixing, plasticizing, shaping or simply carrying the resin in a thermoplastic state from one point to another point.

In common to all of the above-described apparatus and devices for processing thermoplastic polymeric resins are associated means for obtaining and maintaining thermoplasticity of the resin during processing, such as the shaping of the resin material into an article. Maintenance of thermoplasticity may require both heating and cooling of the resin at various times in the processing of the resin. Cooling may be needed to avoid thermal degradation of the resin. Almost all of the resin processing techniques rely at least in part on heating or cooling of the polymeric resin by thermal transfer through the agency of a metal surface, part of the processing apparatus. Heat is generally applied to an outside surface of the metal apparatus by concentrated heat sources such as band heaters, or from within the body of the metal part by heater rods or circulating, heated fluids such as air, water or other chemical liquids. In all cases, the metal heat transferring components have to be of substantial thickness and mass to resist extreme pressures and mechanical forces. The large metal mass responds slowly to changes in thermal input or cooling so that precise control of narrow temperature ranges is difficult to control. Also, when temperature differences are desired in adjacent zones of the same apparatus, it is difficult to localize the particular and different temperatures to be maintained for appreciable periods of time. This shortcoming is especially troublesome for relatively complex processing techniques and apparatus, such as in the injection molding of large parts or in the co-extrusion of multiple-layered film laminations of diverse polymeric resins where the resins employed in the different layers have substantially different temperature requirements for processing.

The improved apparatus of the invention includes as a heater means thin film heaters which may be mounted in close association with the thermoplastic polymeric resins being processed in the apparatus. Heavy metal components to achieve thermal transfer to the resin are not necessary. There can be a saving of weight, materials and labor in manufacture. With the closer juxtaposition of the heating element in the subject plastic, a closer control of resin temperature is maintainable with quicker response times to maintain a pre-determined resin temperature, even in adjacent but different zones or localities. The lower thermal mass of the heating elements is more responsive to cooling or changes from heating to cooling or cooling to heating.

SUMMARY OF THE INVENTION

The invention comprises, in apparatus for thermoplastically processing a thermoplastic, polymeric resin, which comprises;

a housing;

a resin processing chamber within the housing, defined by a chamber wall which is integral with the housing;

an inlet into the chamber for the passage of resin material into the resin processing chamber;

a means for removing from the processing chamber the processed resin material;

means for controlling the resin temperature in the resin processing chamber the improvement which comprises;

employing as the means for controlling the resin temperature a thin film resistance heater disposed on or near the surface of the chamber wall.

The improved apparatus of the invention is useful, for example, to shape thermoplastic, polymeric resins. One embodiment of the improved apparatus of the invention is particularly advantageous for shaping such resins when close control of resin melt temperatures is required, for example in the extrusion of multi-layered articles of two or more different resins with diverse requirements for thermal processing. A second embodiment of the invention is particularly useful for situations wherein rapid thermal cycling is required. Such situations include certain molding operations.

DETAILED DESCRIPTION OF THE PREFERRED EMBODIMENTS OF THE INVENTION

Those skilled in the art will gain an appreciation of the invention from a reading of the following description of the preferred embodiments of the invention, in conjunction with a viewing of the accompanying drawings of FIGS. 1–5, inclusive.

Figure 1:
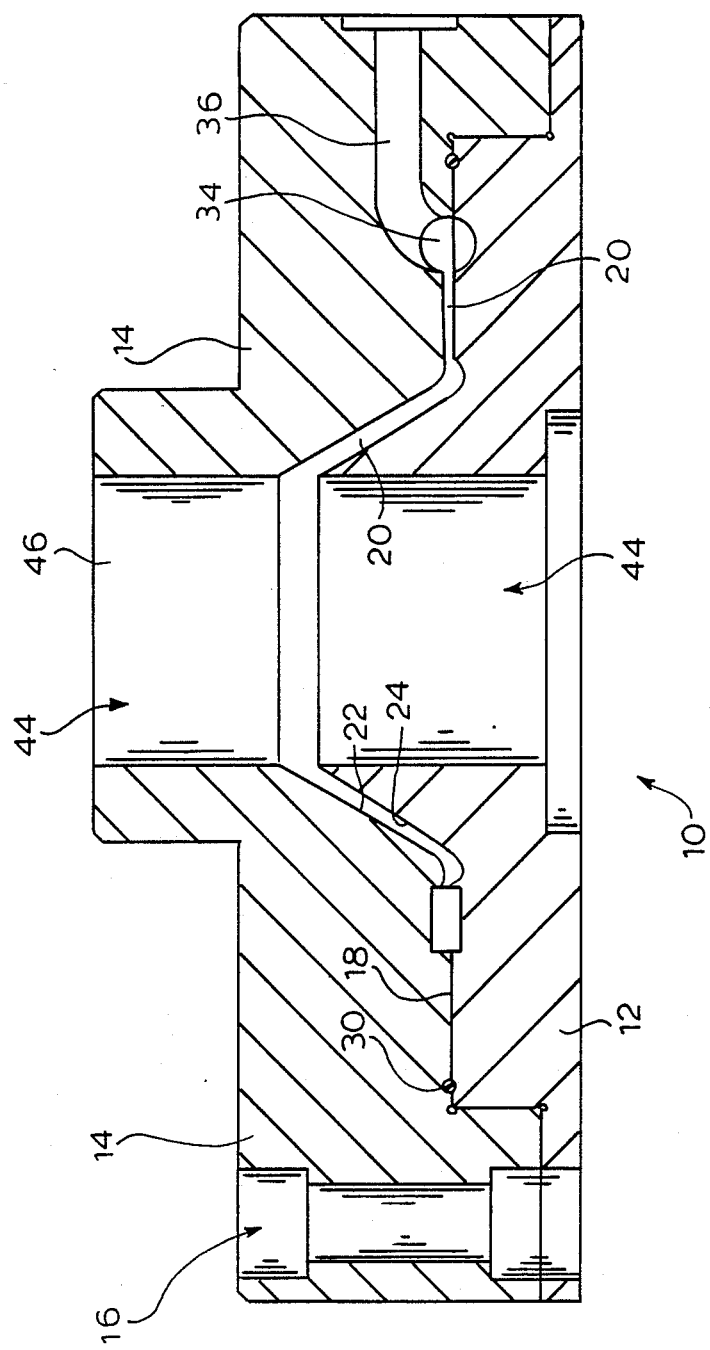
FIG. 1 is a cross-sectional side elevation of an improved die head assembly component, of the invention.

Referring first to FIG. 1, there is seen a crosssectional side elevation of an improved die head assembly component of a type commonly employed to extrude tubular parisons for blow-molding tubular articles. The improved die-head assembly of the invention comprises a plurality of die head modules 10 held together in a vertical stack by a plurality of assembly bolts on the outer perimeter of the module assembly 10, which may, as an example, pass through the bolt passage 16. The modules 10 is made up of a lower plate 12 and an upper plate 14 brought together at line 18 and having opposed adjacent surfaces 22, 24 which together form a resin flow channel 20. A resin inlet 34 carries thermoplastically softened resin into the flow channel 20 from a resin conduit 36. The inlet 34 may be attached to a resin source such as a resin extruder (not shown in FIG. 1). The delivered resin is under pressure which moves it through the chamber 20. The channel 20 distributes the heat softened resin into an annular chamber 44 defined by an interior wall 46 of the module 10 and where the resin distributed is shaped. An annular seal 30 helps contain the distribution of heat-softened resin. As mentioned above, apparatus such as the module 10 functions to deliver a heat-softened, thermoplastic resin via the channel 20. In the prior art apparatus, the transfer of heat to or from the resin was from the mass of the upper and lower plates 12, 14 which were relatively heavy metal plates. The input of heat to the plates 12, 14 may have been through the agency of band heaters attached to the outer periphery of the module 10, adding to the weight and mass of the apparatus. The precise control of resin temperature was often difficult to achieve.

Figure 2:
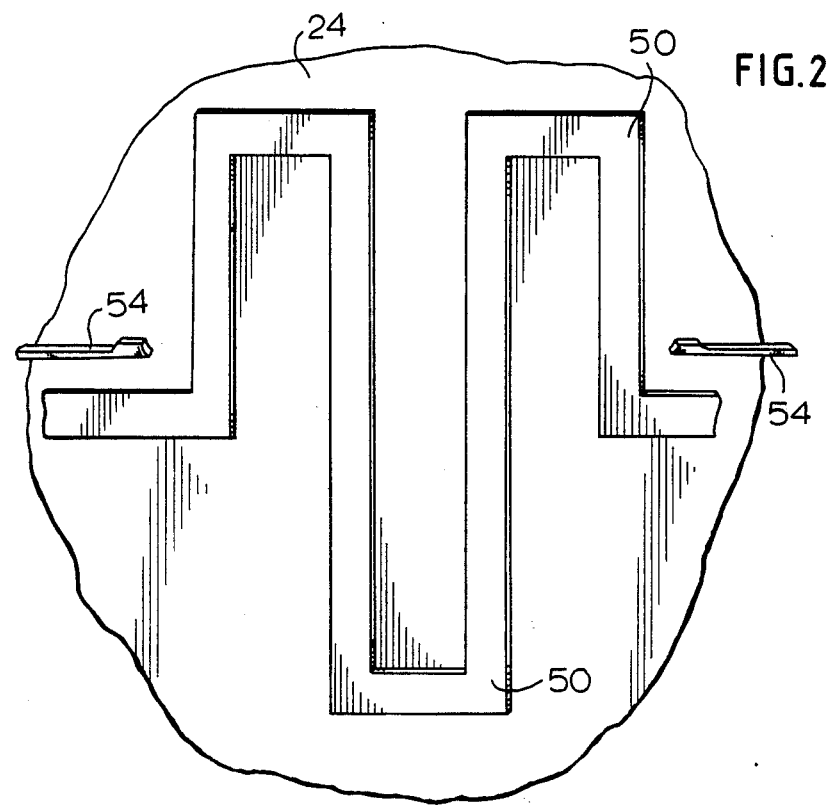
FIG. 2 is an enlarged view of a portion of the chamber wall defining the resin processing chamber shown in the improved die head assembly of FIG. 1.

FIG. 2 is an enlarged view of a portion of the resin chamber 20 wall 24 showing thin-film resistance heaters 50 mounted on the wall 24 of the chamber 20. Interposed between the heaters 50 are thermistors 54 for sensing temperatures between the grids formed of resistance heaters 50. The separate heaters 50 in the form of single strips or grids may be used to zone heat the chamber 20.

Figure 3:
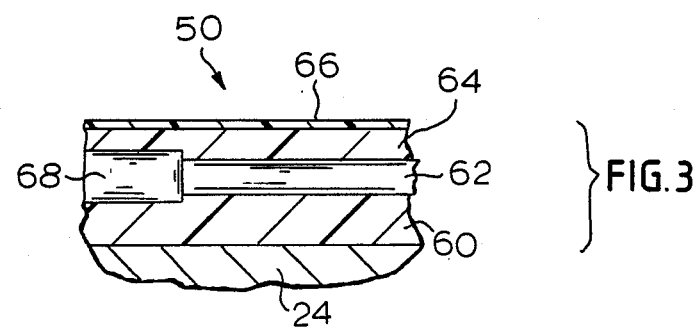
FIG. 3 is an enlarged, schematic view of the resistance heater element shown in FIG. 2.

FIG. 3 is an enlarged view of a part of resistance heater 50 element shown in FIG. 2. In direct contact with the machined steel wall 24 is an electrically non-conductive, insulating layer 60. Preferably the layer 60 is a high temperature, electrical and thermal insulator material, which will readily adhere to the wall 24, for example a film of a ceramic oxide such as silicon dioxide, aluminum oxide, chromium oxide and the like. Overlying the insulative layer 60 is an electrical resistance film 62 of a material having temperature stability sufficient to function as a resistance heater element. The resistance film 62 may, for example, be a film of an electrically conductive metal, metal alloy, intermetallic compound or semi-conductive metal oxide or nitride. A thin strip of a metal such as a foil of nickel, silver, copper, aluminum or an alloy thereof can be used to fabricate the resistance heater film 62. Preferably the resistance element can be a sputter coating of the above mentioned materials and particularly titanium in its nitride form. This film 62 is connected electrically through a connector 68 within an electrical circuit, so that when the circuit is energized, electrical current will flow through the resistance film 62, resulting in the creation of thermal energy for release from the film 62.

Thin-film resistance heaters per se and the method of their manufacture are well known in the art; see for example the descriptions given in U.S. Pat. Nos. 2,899,658; 3,071,749; 3,469,226; 3,517,436 and 4,297,670. The heaters may be selected to provide any desired output of BTU.

Overlying the heater film 62 is a second electrically insulative layer 64 which may be of a material such as described in relation to the electrically insulative layer 60 but advantageously is a good thermal conductor, transparent to infra-red radiation from the resistance heater film 62. An example of such an advantageous material is beryllium oxide. Overlying the insulative layer 64 is a protective film 66 which is normally in contact with the resin. It is advantageously a material characterized by high wear resistance, thermal conductivity, chemical inertness, high natural lubricity and resistance to degradation at high temperatures. Representative of such film materials are coatings of titanium, titanium alloys, chrome, electroless nickel and the like. In some applications, it may be advantageous to have the electrical resistance film 62 in direct contact with the resin such as an injection mold. Examples of other applications include those wherein electrically conductive material, such as metal flakes, are not present in the resin and where other conductive mechanical components such as a screen in an extruder is not present.

The thin film heaters 50 may be varied in thickness, advantageously within the range of from about 0.01 to about 1.0 mm and may be situated as needed to maintain a predetermined temperature at a selected zone or site within the chamber 20.

The controlled temperature of the resin flowing through the chamber 20 permits formation of a uniform resin distribution and subsequent shaping. The temperature of the resin flowing through the chamber 20 is controlled by use of the heaters 50. With inefficient temperature control, some of the distributed resin may be degraded to the point of reduced utility. For example, polycarbonate of a melt extrusion grade requires a temperature of circa 527° F.-572° F. to achieve the proper melt viscosity for extrusion blow-molding. This is a relatively narrow range and if the resin is exposed to a higher temperature for any prolonged period of time, some degradation of the resin may occur. When a plurality of individual heaters 50 are spaced apart on the chamber 20, the heaters 50 individually zone heat areas within the chamber 20 to help balance flow within the processing chamber 20. The correct balance of thermal energy input from the heaters and thermal energy dissipation from the apparatus assure temperature control of the resin without degradation. The zone heater elements may be individually energized and de-energized to maintain a pre-determined melt temperature in zones of the resin melt distribution chamber 20. Thermocouples such as thermistors 54 may be associated with each of the zone heating elements as part of a conventional energizing and de-energizing electrical circuit to aid in the desired temperature control.

Figure 4:
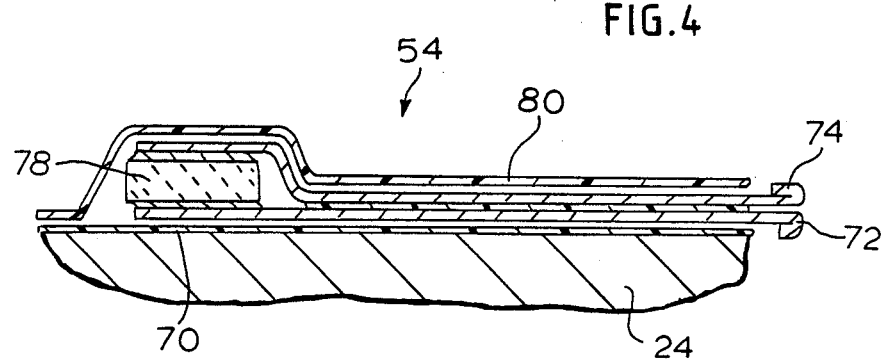
FIG. 4 is an enlarged, schematic view of a thermistor component for sensing the temperature in the vicinity of the heater element of FIG. 3.

FIG. 4 is a cross-sectional side elevation of a portion of the thermistor 54 shown mounted on the chamber wall 24, in FIG. 2. The thermistor 54 produces an analog electrical representation of a sensed temperature and comprises an insulative layer 70 adhered to the wall 24. The layer 70 may be an electrically and thermally insulative layer of the same material described above as useful for the thin-film resistance heaters 50 insulative layer 60. An outer electrically insulative layer 80 may be a thermally transparent material such as that described above as useful for layer 66 of the thin-film resistance heaters 50. The layers 70, 80 form an envelope to enclose insulated lead conductors 72, 74 which are part of an electrical circuit which includes electrical connection with ceramic thermistor 78. Advantageously, the thermistor 54 is one selected to operate with optimum efficiency at a temperature appropriate to the temperatures desired for processing of the resin in the resin chamber 20, preferably within the range of from about 25° C. to 400° C. Thermistors, particularly thin-film thermistors for operation at such temperatures are well known to the art (sometimes referred to as resistance temperature detectors) as are methods of their manufacture; see for example the descriptions given in the U.S. Pat. Nos. 4,317,367; 4,359,372 and 4,434,416.

Figure 5:
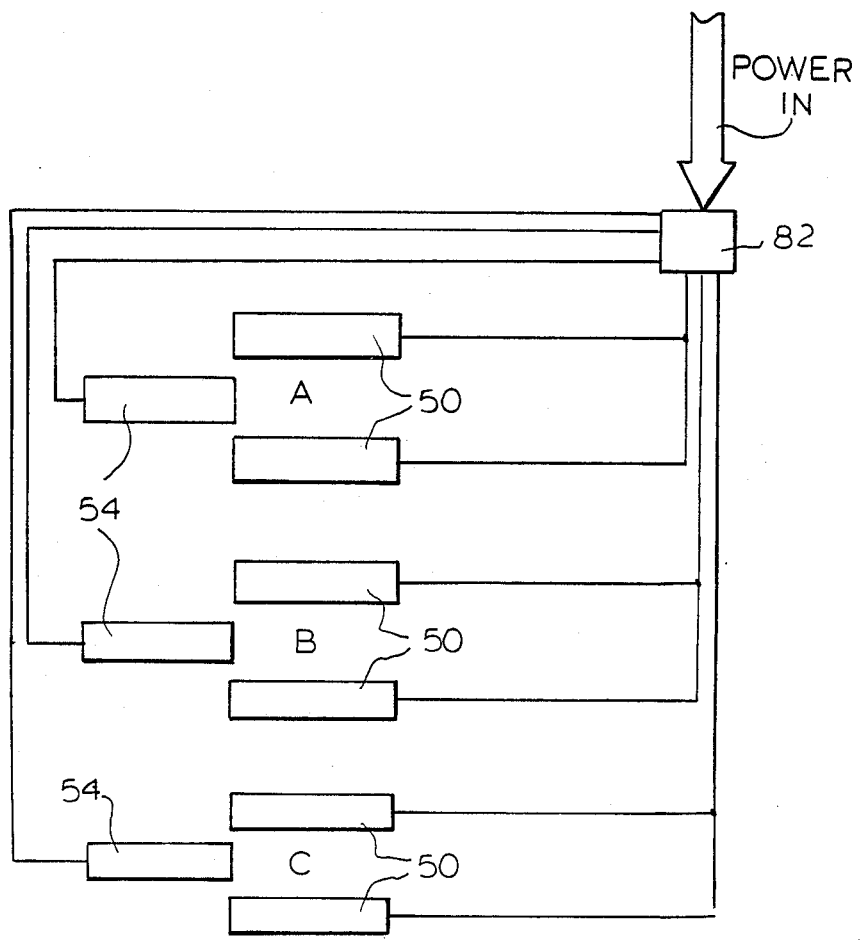
FIG. 5 is a schematic diagram of an electrical circuit which comprises a means of maintaining a predetermined resin melt temperature within the resin processing chamber shown in FIG. 1.

FIG. 5 is a schematic diagram of an electrical circuit which may be employed to operate a heater 50 or a plurality of heaters 50 positioned in different heat zones A, B, C of the chamber 20 and controlled by a plurality of thermistors 54. As shown in the FIG. 5, a plurality of thin-film resistance heaters 50 are electrically connected with an electrical power source through the agency of an electrical controller 82. Any conventional power module may be connected to the controller 82 which comprises a plurality of solid state relays for energizing and de-energizing the heaters 50 and/or a solenoid valve controlling coolant flow. The circuit power lines to the pairs of heaters 50 (each pair being in a different heat zone A, B or C or chamber 20) are energized or deenergized in response to an output signal from the controller 82 initiated by an input signal from the associated thermistor 54 to the controller 82 or by an appropriate timer. The thermistors sense and signal when the temperature falls below or exceeds a pre-determined and desired set point, i.e., when a temperature gradient exists between the set point and the actual temperature sensed in one of the heat zones A, B or C. The analog signal may be converted to a digital signal by an analog to digital converter before entry in a microprocessor component of the controller 82. Set points for a desired resin temperature may be manually entered in the microprocessor and stored in the processor memory. The digitized signal can be compared with the temperature set point. The controller 82 may be a conventional and known multi-channel digital controller, which includes a microprocessor component for proportional control, i.e., capable of varying the magnitude of the energizing current to heaters 50, proportioned to the magnitude of the temperature gradient sensed by the thermistor 54, to be changed in order to maintain the predetermined and desired temperature in any one of the zones A, B or C. Alternatively, the heaters 50 may be energized fully at any time, for times sufficient to change the aforesaid temperature gradient (time proportioning). In any of the zones A, B or C, having an associated cooling means, a solenoid valve may be operated by the controller 82 to control a flow of coolant fluid past the zone. The solenoid would be controlled by the same time proportioning signal from the sensor 54, i.e., the solenoid valve may be opened fully for a period of time proportional to the temperature gradient to be reduced. In the controller 82, the microprocessor can compare a stored temperature set point for the zone A, B and C and generate an output control signal for correction when a temperature gradient occurs, for correction by heating or cooling. The microprocessor can also be programmed to change the temperature set point in a zone downstream (for example in zone B, downstream from zone A) when the temperature in the upstream zone (zone A) has gone awry and some correction is necessary to assure that the resin melt passing from the zones A, B and C is within a critical parameter.

It will be appreciated by those skilled in the art that the scope of the invention is not limited by the description of the preferred embodiments given above and that the invention may be employed to improve a wide variety of apparatus for the processing of thermally plasticized polymeric resins. The apparatus which will be improved by the invention includes apparatus employed for:

1. Injection Molding (large part, long flow channels). The interior surface of the mold coated with the film heater would provide a hot flow channel surface during injection, but would allow rapid cooling due to the low thermal mass of the film heater. This would result in the ability to use longer flow channels, shorter cycle times and lower melt temperatures.

2. Coextrusion of Sheet and Film. The coating of individual layer flow surfaces would result in the ability to use widely varying melt temperature polymer combinations, with improved control for distribution and thickness of the resin.

3. Coextrusion Blow Molding. The coating of individual layer flow surfaces would result in the ability to use lighter construction, better control distribution, manufacture more complex shapes, reduce heat-up time and use more widely varying melt temperature polymer resin combinations.

4. Other applications include, but are not limited to rotational molding, profile and pipe extrusion and any other resin processes where application of heat is involved, and especially in the manufacture of multi resin layer constructions or when rapid temperature cycling is desired.

The improved apparatus of the invention may be used to thermally process any conventional and known processable polymeric resins including, for example, cellulose esters and ethers such as ethyl cellulose acetate, acetobutyrate, and acetopropionate; vinyl and vinylidene polymers and copolymers such as polymers and copolymers of vinyl chloride, vinyl acetate, vinyllidene chloride, polyvinyl alcohol, polyvinyl butyral and polymers and copolymers of olefins, such as ethylene, propylene and butylene; polymers and copolymers of styrene, 2-methyl styrene and their mixtures of elastomeric copolymers; polyamides, interpolyamides such as polyhexamethylene adipamide, polycaproloctam, polyundecanamide, polyhexamethylenesebacamide; polycarbonates; polyaldehydes, polyethers; polyurethanes; polyesters, natural and synthetic thermoplastic elastomers; thermoplastic fluorinated resins; silicone thermoplastic elastomers, moldable thermoset resins such as phenolics, epoxides and the like.

These thermoplastic resin materials may be used neat or in admixture with fillers, plasticizers, colorants, or other ordinary additives, provided they do not prevent processing.

What is claimed is:

1. In an injection molding apparatus for injection molding of a thermoplastic resin, which comprises an interior mold surface, the improvement which comprises; a thin-film resistance heater disposed on the surface of the mold.

2. The improved molding apparatus of claim 1 in association with a thermoplastic resin extruder.

3. The improved molding apparatus of claim 1, which further comprises;
   a housing for the mold surface;
   a resin flow channel which functions as a processing chamber within the housing, defined by a chamber wall which is integral with the housing,
   an inlet into the chamber for the passage of resin material into the resin processing chamber; and
   a means for removing from the processing chamber the processed resin material.

4. The improved apparatus of claim 3, wherein there is temperature control means associated with the heater.

5. The improved apparatus of claim 4 wherein the temperature control means comprises a thermistor mounted on the chamber wall.

6. The improved apparatus of claim 3 wherein a plurality of thin-film resistance heaters operates in separate zones of the chamber.

7. The improved apparatus of claim 3 which further comprises means for cooling the resin in the chamber.

8. The improved apparatus of claim 2 wherein the extruder die is selected from the group consisting of a blown film die, blow molding head, slit die for sheet and film, pipe die, profile die, or pultrusion die.

* * * * *